Figure 1:
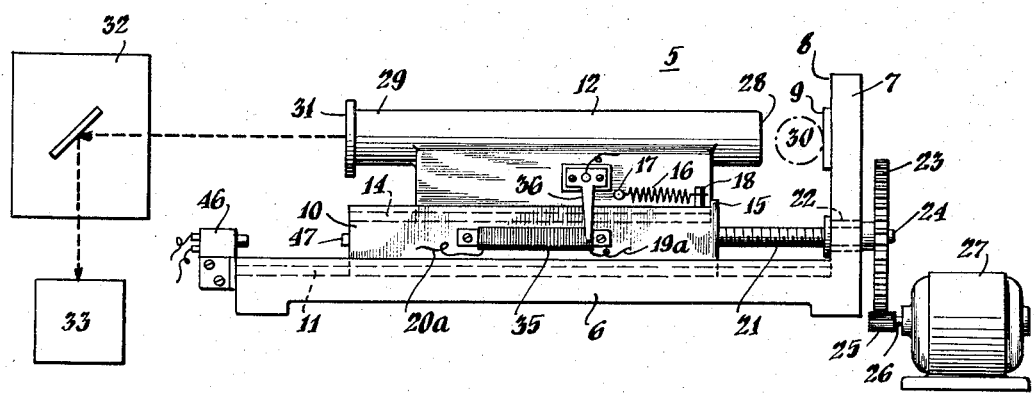

April 7, 1959 W. W. WOOD 2,880,514

INTERFEROMETRIC MICROMETER

Filed Feb. 14, 1955

United States Patent Office 2,880,514
Patented Apr. 7, 1959

2,880,514

INTERFEROMETRIC MICROMETER

William W. Wood, Binghamton, N.Y., assignor to Link Aviation, Inc., Binghamton, N.Y., a corporation of New York Application February 14, 1955, Serial No. 488,013

8 Claims. (Cl. 33—164)

This invention relates to means for making precise mechanical measurements, and more particularly to improved micrometer adjusting means for accurately controlling the forces applied to work pieces under measurement. The invention is particularly useful when embodied in precise measuring apparatus such as an interferometric micrometer.

A measuring device of the type known as an interferometric micrometer, which employs light wave interference fringes as the unit medium of physical measurement, is disclosed in United States Patent 2,604,004 issued July 22, 1952, to Elihu Root III. The present invention represents an improved measuring head for use with such a device, or with other forms of interferometric micrometers.

Because of the very high order of precision measurements possible with such apparatus, physical dimensions being measurable in ten thousandths of a millimeter, it becomes very important that the force applied to a sample or workpiece under measurement be accurately controlled and that successive measurements of different samples may be made under identical conditions. As even the hardest of materials may deform slightly under the application of pressure, or measuring force, it is essential that successive measurements of the desired accuracy be made under conditions assuring the application of identical forces from the measuring head. It is not necessary that the absolute magnitude of measuring force be known, but it is desirable that the amount of applied force be adjustable within known predetermined limits, and it is essential that the measuring apparatus be capable of accurately reproducing any selected degree of measuring force, to facilitate precise measurement of different objects under selected conditions. It is also important to the accuracy of measurement that the temperature of objects being measured should be carefully controlled, and various means for maintaining constant temperature conditions are well known in the art. Means for controlling the applied measuring force with the desired accuracy, however, have not heretofore been available, and it is to this end that the present invention is directed.

It is an object of the invention to provide improved measuring means whereby more accurate dimensional measurements may be made.

Another object of the invention is to provide means for making dimensional measurements with an interferometer more rapidly and with uniform accuracy.

A further object of the invention is to provide improved means for controlling and regulating the pressure applied to measured samples in precision measuring apparatus.

Another object of the invention is to provide automatic means for applying selected forces to samples to be measured in precision measuring apparatus.

A further object is to provide improved measuring apparatus capable of repeatedly reproducing any selected conditions of measurement, as successive measurements are made thereby.

The invention accordingly comprises the features of construction, combination of elements, and arrangement of parts, which will be exemplified in the construction hereinafter set forth, and the scope of the invention will be indicated in the claims.

Figure 2:
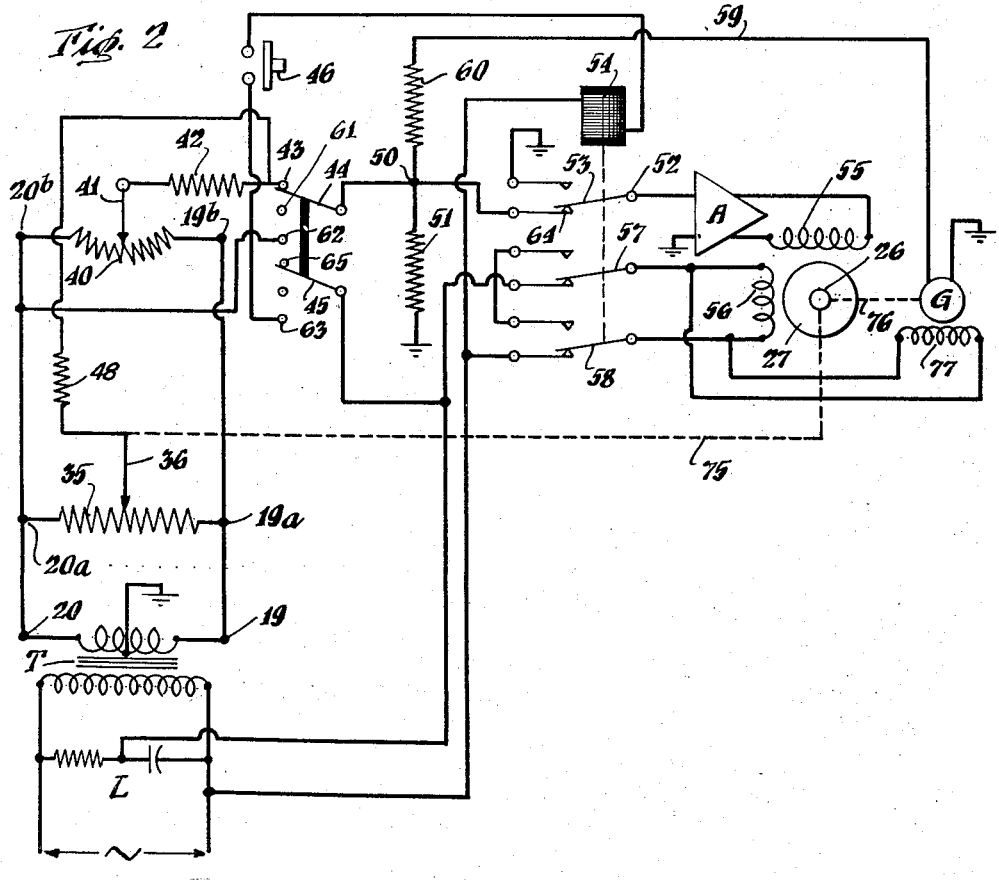

For a fuller understanding of the nature and objects of the invention reference should be had to the following detailed description taken in connection with the accompanying drawings, in which:

Fig. 1 represents a front elevation profile view of a preferred form of work holding apparatus, with associated optical and measuring apparatus indicated schematically; and Fig. 2 is a schematic circuit diagram of a preferred embodiment of the invention, disclosing means for controlling the positioning of the work holding apparatus.

The measuring apparatus indicated generally at 5 in Fig. 1 comprises a stationary bed 6 having a perpendicularly disposed end portion 7 integral therewith. To the inner face 8 of perpendicular member 7 is affixed an anvil 9. A movable base portion 10 is slidably supported on stationary bed 6, the movable base 10 resting in guide tracks 11 which limit the direction of sliding motion of base 10 to a straight line extending in the left-right direction as viewed in Fig. 1. Slidably supported on top of movable base 10 is a movable measuring head 12 which is limited to left-right motion with respect to base 10, as viewed in Fig. 1, by guide track 14 in the top of base 10. Guide 14 extends parallel to guide 11 whereby movable measuring head 12 is limited to longitudinal motion in the left-right direction with respect to stationary bed 6, as shown in Fig. 1. It is to be understood, however, that the apparatus is not limited to horizontal orientation, as disclosed in Fig. 1, but that the portion of the apparatus comprising bed 6 and movable members 10 and 12 may be mounted vertically, in which case the perpendicular member 7 will then be disposed horizontally. Such vertical mounting of the apparatus may be considered preferable in many installations, as the work-piece, indicated at 30, may thereby be supported on the anvil 9 by the force of gravity. In the description which follows, all references to vertical or horizontal disposition of structural elements relate solely to the apparatus as disclosed in Fig. 1 of the drawing and are not to be construed as structural limitations of the invention.

As shown in Fig. 1 of the drawing, movable head 12 is normally maintained substantially adjacent the right hand end of track 14, against the shoulder 15 of movable base 10, by means of spring 16, one end of which is fastened to pin 17 on movable head 12, while the other end of spring 16 is fastened to vertical pin 18 on base 10. A horizontally disposed lead screw 21 engages screw follower threads in movable base 10 and is supported by journal bearing 22 through the lower perpendicular portion 7 of stationary bed 6. A spur gear 23 affixed to the protruding end 24 of lead screw 21 engages pinion 25 on rotatable drive shaft 26 of a reversible electric motor 27, whereby upon operation of motor 27 the lead screw 21 is rotated to impart sliding motion to movable base 10 with respect to stationary bed 6. Slidable base 10 may be moved either toward or away from the perpendicular portion 7 of bed 6, depending upon the direction of operation of motor 27. A limit switch 46 is mounted on the opposite end of bed 6 in a position to be engaged by end 47 of movable base 10, for the purpose of interrupting operation of motor 27 when base 10 is moved to its extreme open position, into engagement with switch 46.

As base 10 moves, so moves measuring head 12 which is carried thereby as described above. The end 28 of measuring head 12 may thus be moved either toward or away from anvil 9 affixed to perpendicular member 7 of stationary bed 6, the end 28 and anvil 9 cooperatively forming a pair of micrometer "jaws" between which a sample work-piece, indicated by broken lines at 30, may be positioned for measurement. The opposite end 29 of measuring head 12 carries reflecting surface 31 which receives and reflects light rays from the optical system 32 as fully described in U.S. Patent 2,604,004 to Root.

Electrical impulses from the light ray interference rings developed in the optical interferometer 32 are fed into counter 33 which may be any suitable impulse counter. One form of counter which may be employed is disclosed in the aforesaid patent to Root. Improved forms of counters suitable for use with the micrometer of the invention, as shown in Fig. 1, are disclosed by copending applications of Monson H. Hayes, Serial No. 425,462, filed April 26, 1954, now Patent No. 2,833,476; Richard G. Stephens, Serial No. 444,987, filed July 22, 1954; and John Kaufmann, Serial No. 454,292, filed September 7, 1954; all of which are assigned to the assignee of the present invention.

Mounted on slidable base 10, but insulated therefrom, is a potentiometer resistance card 35 which is preferably a precision wirewound type of resistor having successive windings of the resistance element exposed for conductive engagement with a slider arm 36 which is mounted on, but insulated from, movable head 12. Any relative motion between movable head 12 and base 10, from the normal position illustrated by Fig. 1, results in a displacement to the left of slider 36 from its normal point of contact with the right hand end of potentiometer resistance card 35, as shown in Fig. 1 of the drawing.

In operation, a sample, or work-piece the dimensions of which are to be measured, is placed between the anvil 9 and the head 28, as shown by the work-piece 30 in Fig. 1, and motor 27 is operated to drive lead screw 21 in a direction to advance the measuring head 12 toward the anvil 9 until the work-piece sample becomes engaged between the end 28 of head 12 and anvil 9. Further operation of motor 27 will continue to advance base 10 toward perpendicular member 7, but the head 12, which is now engaged with the work-piece sample 30, will be restrained from further movement toward anvil 9 (except for any slight deformation which may be produced in the work-piece 30 due to the force exerted on it by movable head 12), and consequently, the relative motion between measuring head 12 and movable base 10, against the tension of spring 16, will move the slider 36 toward the left end of resistance card 35 as viewed in Fig. 1. By suitable connections between the potentiometer 35, slider 36, and the apparatus shown schematically in Fig. 2, the operation of motor 27 may be automatically controlled to limit the extent of relative motion between measuring head 12 and movable base 10 so as to apply any preselected force to the work-piece sample 30.

Although the preferred embodiment disclosed by Fig. 1 illustrates a horizontally movable measuring head, it is to be understood as suggested above that the apparatus of the invention may be mounted for vertical movement, or for movement of the measuring head at any desired angle with respect to the horizontal plane, without departing from my invention.

Referring now in greater detail to Fig. 2 of the drawing, the operation of the automatic control circuit will be described. A suitable potential is applied across potentiometer resistance element 35, either from an alternating current transformer as represented at T or from a direct current source (not shown). As alternating current is generally available commercially, the use of alternating current energy may be considered preferable and will be assumed in the description which follows.

It will be understood that if at any instant the secondary terminal 19 of transformer T has a positive instantaneous polarity, the opposite terminal 20 will be at a negative potential. As the slider 36 is normally biased by spring 16 to engagement with the right hand end 19a of potentiometer 35, as shown in Fig. 1, this instantaneous potential is applied through resistor 48, switch arm 44 in engagement with contact 43 and relay arm 53 in engagement with contact 64 to the input terminal 52 of amplifier A and operates motor 27 in a direction to move the measuring head 12 toward the anvil 9.

Connected in parallel circuit relationship with the potentiometer resistance element 35 is another potentiometer 40, the movable contactor 41 of which is manually adjustable by an operator and provides a means for setting the apparatus to apply any preselected force to samples which are to be measured by the micrometer of the invention. The movable contactor 41 may carry an index in registration with a calibrated scale (not shown) to indicate to the operator what force will be applied by the apparatus for each setting of the contactor 41. Potentiometer slide contactor 41 is connected through fixed resistor 42 to terminal 43 of double pole multi-contact selector switch $S_1$. Slide contactor 36 of potentiometer 35 is connected through fixed resistor 48 through switch arm 44 to junction 50 when switch $S_1$ is moved to its upper position, which connects with the input terminal 52 of summing amplifier A through relay contactor 53 when relay 54 is deenergized, as illustrated in Fig. 2 of the drawing. A circuit is also completed from slide contactor 41 of potentiometer 40 through fixed resistor 42 and switch arm 44 to junction 50 when switch $S_1$ is moved to its upper position with switch arm 44 in engagement with contact 43. By these circuit connections, the sum of the potentials present at potentiometer sliders 36 and 41 may be applied across fixed resistor 51, which is the input summing resistor of amplifier A, between junction point 50 and ground.

If the potentiometer arm 41 is adjusted to the midpoint of potentiometer 40, the instantaneous potential at that mid-point will be zero, so that the entire potential present at slider arm 36 is applied to the input of amplifier A. As the measuring head 12 (Fig. 1) engages a work-piece in the apparatus, slider 36 is deflected from the end 19a of potentiometer 35 toward the opposite end 20a, until slider 36 reaches the midpoint of potentiometer 35, and zero potential is applied to the input of amplifier A, whereupon the motor 27 stops. If it is desired to increase the force applied to a work-piece being measured, by operating motor 27 to advance base 10 until slider 36 is deflected to the opposite end, 20a, of potentiometer 35, and the tension of spring 16 is thereby further increased, it is only necessary to adjust the force-setting potentiometer arm 41 toward the end 19b of potentiometer 40. Conversely, if it is desired to apply less force to the measured sample, slider 41 may be moved toward the opposite end, 20b, of potentiometer 40. Thus, it will be apparent that any desired force, within the range through which spring 16 may be stressed, may be selected by adjusting potentiometer slider 41 to different positions on potentiometer 40. If desired, the potentiometer arm 41 may be indexed to a calibrated scale, to facilitate its adjustment to any desired measuring force. Also, if desired, means (not shown) may be provided for varying the static tension of spring 16, as for example, by a thumb screw.

Amplifier A may be a conventional servo amplifier. The output of amplifier A is connected to winding 55 of motor 27, which may be a two-phase induction motor. The other winding, 56 of motor 27, is connected through contacts 57 and 58 of relay 54 de-energized, to the same alternating current power source which supplies transformer T. This connection is such that winding 56 is excited by a current 90° out of phase with the output signal from amplifier A which is connected to winding 55 of motor 27.

As represented schematically by broken line 75, the slide contactor 36 of potentiometer 35 is mechanically coupled to the drive shaft 26 of motor 27. This mechanical coupling is that disclosed by the physical structure of Fig. 1 as described above, and provides a mechanical feedback connection between the output shaft of motor 27, which is driven by the energy output of amplifier A, and the input circuit to amplifier A, as will be more fully described hereinafter.

To prevent overriding of the motor 27, or hunting about a balance point, it is desirable to provide some means of rate-controlled feedback in addition to the direct mechanical feedback represented by the coupling 75. For this purpose, I prefer to use a tachometer generator G, which is coupled to the drive shaft 26 of motor 27 by mechanical means represented by the broken line 76 in Fig. 2. Field coil 77 of generator G may be energized from the same source to which winding 56 of motor 27 and transformer T are connected. The variable output potential from tachmeter generator G, which is proportional to the rate of rotation of shaft 26, is connected by conductor 59 through fixed resistor 60 to amplifier input junction 50 as shown in Fig. 2 of the drawing.

In operation, the error signal initially applied to the input of amplifier A at junction 50, i.e. the sum of currents through resistors 42 and 48, completely predominates over the rate signal from generator G so that the servo amplifier A is saturated and the motor 27 is caused to run at high speed whereby the measuring head 12 (Fig. 1) is rapidly advanced toward the micrometer anvil 9. As soon as the end 28 of measuring head 12 engages a work-piece (shown at 30 in Fig. 1), spring 16 yields, allowing potentiometer contactor 36 to move over potentiometer 35 whereby the potential of contactor 36 approaches the magnitude of potential from contactor 41. Since the potentials of contactors 36 and 41 are opposite in polarity, they tend to cancel each other, and this motion of contactor 36 decreases the error signal applied to amplifier A. When the difference of potential between contactors 36 and 41 has decreased to a relatively small value, this error signal no longer predominates and the rate signal from tachometer generator G commences to affect the resultant input to amplifier A. Due to the small time constant of the tachometer generator G, and to the high amplification provided by amplifier A, this arrangement provides monitoring feedback which affords very accurate speed control of motor 27, as well as very high speed of response to changes of amplifier input potential. It will be understood by those skilled in the art that other forms of rate-controlled feedback monitoring may be employed for servo stabilization, as for example notch networks may be used instead of the tachometer generator G.

The step by step operation of the circuit of Fig. 2 will now be described with reference to the measurement of a sample work-piece placed in the measuring device of Fig. 1. Starting with the "jaws" of the measuring device 5 in the open position as shown in Fig. 1, the operator moves potentiometer arm 41 from its neutral position to a preselected setting and moves selector switch S₁ to the upper position illustrated in Fig. 2, bringing switch arm 44 into engagement with contact 43. This operation of switch S₁ also disengages switch arm 45 from contact 63, thereby removing power from relay 54 and allowing relay arms 53, 57 and 58 to fall to the positions illustrated in Fig. 2. Arm 53 of relay 54 now engages contact 64 to connect the input terminal 52 of amplifier A to junction 50, while relay arms 57 and 58 connect motor coil 56 and generator coil 77 to the power line source L. The difference in potential now appearing between potentiometer arms 41 and 36 is impressed upon the input of amplifier A, through resistors 42 and 48, and arm 53 of relay 54 in engagement with contact 64, to produce an amplified output signal across motor winding 55 which causes the motor 27 to operate. Motor 27 now drives the movable base 10 and its associated measuring head 12 (Fig. 1) toward the work-piece 30 which is to be measured. As the base 10 advances, limit switch 46 (which may have been previously closed by engagement with end 47 of base 10) is now opened to leave relay 54 deenergized. The difference in potential between potentiometer arms 41 and 36, which is applied to the input of amplifier A, initially remains constant and the motor 27 continues to operate at its normal maximum speed until the end 28 of measuring head 12 comes into contact with the work-piece 30. At this instant, the measuring head 12 is deflected, wtih respect to the moving base 10, against the tension of spring 16, and the potentiometer arm 36 slides along the resistance element 35 thereby changing the potential appearing at contactor 36. This relative motion between measuring head 12 and moving base 10 continues until the potential selected by the contactor arm 36 from potentiometer 35 is equal in magnitude but opposite in polarity to the instantaneous potential appearing at potentiometer arm 41. With each incremental change of potential on sliding contactor 36, the total potential difference appearing at junction 50 is reduced, thereby allowing the potential from generator G, which is fed back through conductor 59 and resistor 60, to exert a greater influence on stabilization of the speed of motor 27. This monitored generator potential fed back through conductor 59 and resistor 60, and applied in opposition to the potential otherwise appearing at junction 50, serves to smooth and stabilize the changes in speed of motor operation. As the varying potential on moving contactor 36 approaches the magnitude of the preselected potential on potentiometer arm 41, the total potential applied to the input of amplifier A decreases and the speed of motor 27 is thereby reduced. Each incremental reduction in speed of motor 27 also reduces the monitoring potential fed back from generator G. When slider 36 has advanced to a position on potentiometer 35 at which the potential on slider 36 is exactly equal to the preselected potential at 41, but of opposite instantaneous polarity, the sum of the potentials appearing at junction 50 equals zero, and the motor 27 comes to a complete halt.

When the motor 27 is automatically stopped by the balancing of potentials between potentiometer arms 41 and 36, the dimension of the work-piece 30 is measured by the interferometer 32, and the measurement is displayed to the operator by the counter-indicator 33. To remove the work-piece from the jaws of the micrometer, after measurement, the operator shifts switch S₁ to the lower position in Fig. 2 so that switch contactor 44 is disengaged from contact 43 and brought into engagement with contact 62. By this action arm 45 of switch S₁ is also brought into engagement with contact 63, conditioning a circuit for relay 54 to be energized by subsequent closure of normally open limit switch 46. By connection of arm 44 to switch contact 62 the potential present at potentiometer end 20b is applied to junction 50. This potential is of opposite polarity to that potential from the end 19a which formerly operated motor 27 in a direction to advance the measuring head 12 into engagement with the work-piece 30. Consequently, motor 27 now operates in the reverse direction and drives the movable base 10 in the opposite direction, from right to left as viewed in Fig. 1, to open the jaws of the micrometer measuring device and release the work-piece.

This reverse operation may be interrupted by the operator at any desired position simply by moving contactor arm 44 of switch S₁ to its neutral position in engagement with idle contacts 61 and 65, or otherwise the reverse operation will be automatically interrupted by engagement of end 47 of movable base 10 with limit switch 46 when the micrometer measuring head has moved to its extreme open position. This automatic interruption of operation in the extreme open position results from closure of normally open switch 46 to complete a circuit from power line L through arm 45 of switch S₁ which was previously engaged with contact 63, whereby relay 54 is energized. Operation of relay 54 brings up relay arms 53, 57 and 58 to disconnect the input terminal 52 of amplifier A from junction 50 and to ground the amplifier input through relay arm 53, while relay arms 57 and 58 disconnect motor coil 56 and generator coil 77 from power line L and apply a short circuit across both coils 56 and 77 to effect dynamic braking of the motor 27.

From the above description, it will be understood that the setting of the force selector potentiometer arm 41 determines the deflection of potentiometer arm 36 required to bring the motor 27 to rest, and hence controls the tension to which spring 16 (Fig. 1) is stressed, thereby determining the force which is applied by measuring head 12 to the work-piece sample 30 under measurement. The setting of potentiometer arm 41 thus controls the force with which sample 30 is contacted by movable measuring head 12, and any given setting of potentiometer arm 41 will assure that identical forces will be applied to any number of successively measured work-pieces, regardless of differences in their size or shape.

It is to be understood that the pressure sensing means which may be employed in the invention are not limited to a combination of springs and potentiometers as disclosed in the preferred embodiment, but that any suitable form of force-to-electrical signal transducer may be employed, as for example a spring and differential transformer, or a strain gauge may be employed. It is further to be understood that either an A.C. or D.C. servo motor may be employed, in combination with either an A.C. amplifier, a D.C. amplifier, a magnetic amplifier, or a saturable reactor, all of which are equivalent means to those disclosed in the preferred embodiment and are therefore within the scope of the invention.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A precision measuring device for interferometers comprising a reversibly movable member, reversible motor drive means for moving said member into engagement with a work-piece to be measured, yieldable mounting means between said movable member and said motor drive means, a proportional force responsive electrical transducer coupled to said drive and operable by movement of said yieldable means, further electrical signal means adjustable at will, means for combining electrical signals from said adjustable means and said transducer, means for amplifying said combined signals, means for operating said motor means by said amplified signals, and rate-controlled feedback monitoring means from said motor drive to said signal combining means for controlling the direction and speed of said motor operation according to polarity and magnitude of the net resultant signal applied to said amplifying means.

2. Precision measuring means comprising an interferometric micrometer, a reversibly movable member whose net change of position is to be measured by said interferometer, reversible motor drive means for moving said member into or away from engagement with a work-piece, yieldable mounting means between said movable member and said motor drive means, a proportional force-responsive electrical signal transducer between said movable member and said motor drive means, a manually adjustable electrical signal selector, means for combining a selected signal from said manually adjustable means with a signal from said force-responsive transducer, means for amplifying said combined signals and for operating said motor drive by the amplified resultant thereof, and speed responsive monitoring means operable by said motor to apply a signal proportional to the speed thereof in opposition to the combined signals from said selector and transducer, whereby the direction and speed of said motor operation is regulated according to the polarity and amplitude, respectively, of the net resultant signal impressed upon said amplifying means.

3. In an interferometric micrometer, work holding means comprising a reversibly movable member whose net change of position is to be measured, reversible motor drive means for moving said member into engagement with a work-piece to be measured, first variable potential dividing means coupled to said movable member, yieldable mounting means between said movable member and said motor drive means whereby said first potential divider is varied as said member is moved against a work-piece, a second potential divider connected in parallel circuit relationship with said first potential divider, means for applying a common potential across both of said dividers, a potential combining circuit and a potential amplifier, a variable potential tap on said first potential divider connected to said combining circuit and operable by the movement of said movable member relative to said mounting means, a manually adjustable tap on said second potential divider connected to said potential combining circuit, means for applying the combined resultant potentials from said taps to the input of said amplifier, means connecting the output of said amplifier to said drive motor whereby said motor is operated, and rate-controlled electrical feedback monitoring means between the output shaft of said motor and the input of said amplifier whereby the operation of said motor is regulated to stop when the potential from said motor driven first potential divider equals the selected potential from said second adjustable potential divider.

4. In a precision micrometer, work holding and measuring means comprising a reversibly movable member, reversible motor drive means for moving said member into or away from engagement with a work-piece to be measured, spring loaded mounting means between said movable member and said motor drive means, first variable potential dividing means operable by relative motion between said reversibly movable member and said spring loaded mounting, a second potential divider adapted to be manually adjusted by an operator, means for applying a common potential across both of said dividers, means for combining the divided potentials from both of said potential dividers, means for amplifying said combined potentials, means connecting said drive motor to said amplifying means whereby said motor is operated by said amplified potentials, a tachometer generator coupled to the shaft of said motor, and means connecting the output of said generator to said potential combining circuit in opposition to the combined potentials from said first and second potential dividers, whereby the speed and direction of said motor operation is regulated according to the resultant polarity and amplitude of said combined signals and operation of said motor is halted when the potential from said motor driven variable first potential divider is equal and opposite to the selected potential from said second adjustable potential divider.

5. In a precision micrometer, work holding means comprising a stationary bed having a perpendicularly disposed member integral therewith, a base movably mounted in parallel guides on said bed, a lead screw journaled through the perpendicular member of said bed and extending at least partially through said movable base, screw follower means on said base in engagement with said lead screw, motor drive means including speed reduction means coupled to said lead screw for imparting rotation thereto, a measuring head yieldably mounted upon said movable base, guide means between said head and said base and parallel to the aforesaid guide means of said bed for limiting relative motion between said head and said base to a direction substantially parallel to the axis of said lead screw, spring biased means connected between said base and said head normally restraining motion therebetween, and variable potential dividing means mounted on said base and said head and operable by relative motion therebetween.

6. In a precision interferometric micrometer, work holding and measuring means comprising a stationary bed having a perpendicularly disposed member integral therewith, a base movably mounted in parallel guides on said bed, a lead screw journaled through the perpendicular member of said bed and extending at least partially through said movable base, screw follower means on said base in engagement with said lead screw, motor drive means including speed reduction means coupled to said lead screw for imparting rotation thereto, a measuring head yieldably mounted upon said movable base, guide means between said head and said base and parallel to the aforesaid guide means of said bed for limiting relative motion between said head and said base to a direction substantially parallel to the axis of said lead screw, spring biased means connected between said movable base and said head normally restraining motion therebetween, and position indicator means coupled between said movable base and said yieldable measuring head and operable by relative motion between said base and said head to produce an electrical signal indicative of the relative position of said base and said head.

7. In a precision micrometer, work holding and measuring means comprising a reversibly movable member, reversible motor drive means for moving said member into or away from engagement with a work-piece to be measured, spring loaded mounting means between said movable member and said motor drive means, first variable potential dividing means operable by relative motion between said reversibly movable member and said spring loaded mounting, a second potential divider adapted to be manually adjusted by an operator, means for applying a common potential across both of said dividers, means for combining the divided potentials from both of said potential dividers, means for amplifying said combined potentials, means connecting said drive motor to said amplifying means whereby said motor is operated by said amplified potentials such that the speed and direction of said motor operation is regulated according to the resultant polarity and amplitude of said combined signals and operation of said motor is halted when the potential from said motor driven variable first potential divider is equal and opposite to the selected potential from said second adjustable potential divider.

8. An interferometric micrometer work-piece force adjusting means comprising reversible movable means to be positioned into engagement with a work-piece, reversible driving means, means yieldably connecting said reversible movable means with said reversible driving means, means for providing a first potential commensurate with the force applied to the work-piece, means for producing a second potential of opposite polarity from said first potential and of a magnitude commensurate with a reference force, means for combining said first and second potentials for producing a resultant potential, and means for applying said resultant potential to said reversible driving means whereby said reversible movable means is yieldably driven toward engagement with said work-piece until a force equal to the reference force is applied and said resultant potential is zero.

References Cited in the file of this patent
UNITED STATES PATENTS

| | | |
|---|---|---|
| 2,457,558 | Hornfeck | Dec. 28, 1948 |
| 2,604,004 | Root | July 22, 1952 |